Figure 1:
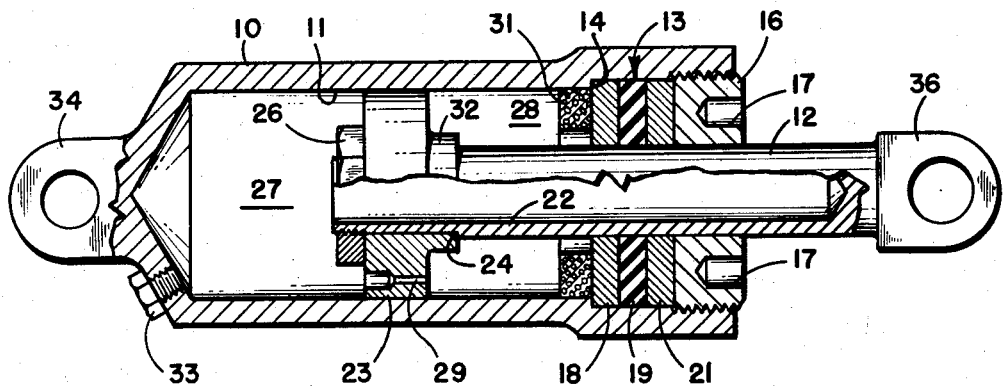

Feb. 17, 1959  W. HAMILTON  2,873,964
FLUID SPRINGS
Filed Nov. 15, 1956

INVENTOR.
WALLACE HAMILTON
BY
ATTORNEY

United States Patent Office 2,873,964
Patented Feb. 17, 1959

2,873,964

FLUID SPRINGS

Wallace Hamilton, Bentleyville, Ohio, assignor to Cleveland Pneumatic Industries, Inc., Cleveland, Ohio, a corporation of Ohio Application November 15, 1956, Serial No. 622,349

2 Claims. (Cl. 267—64)

This invention relates generally to fluid springs and more particularly to a light-weight fluid spring which may operate at very high pressures.

In recent years, air-oil shock absorbers and springs have been utilized in aircraft installations particularly in the landing gear field. In such devices, air is compressed to provide the spring action and liquid is forced through a flow restriction to provide the shock absorbing or damping action. More recently, springs and shock absorbers have utilized the compressibility of liquids at very high pressures wherein the liquid itself is compressed to provide the resilient spring action. In the former type of devices wherein air is compressed, there tends to be a limit on how high an operating pressure can be utilized because the quantity of gas decreases as the pressures go up and small quantities of gas are difficult to control. In the latter case, difficulty is encountered because liquid although compressible requires extremely high pressures to obtain a workable degree of compression. Generally speaking, the higher the operating pressure of a spring, the lighter the overall unit will be for a given load carrying capacity. However, in the case of liquid springs, the stroke and the load carrying capacity of the spring determine the compression volume which the liquid must be subject to. For any given liquid, this compression volume determines the volume of liquid which must be compressed if workable pressures are to be utilized. Therefore, the compressibility of the liquid dictates the size of the unit for any given installation and the fact that liquids have only a small degree of compressibility often results in a weight penalty.

In a spring according to this invention, I combine the advantages of both the air-oil type unit and the advantages of the liquid spring and utilize both the compressibility of fluids in the liquid and gaseous state.

An important object of this invention is to provide a fluid spring wherein fluid in both the liquid and gaseous states are compressed.

Another object of this invention is to provide a high pressure gas-liquid shock absorber and spring combination.

Still another object of this invention is to provide a fluid spring having a very small amount of gas contained therein which can be compressed to very high pressures in the operation of the spring.

Another object of this invention is to provide a fluid spring having fluid in both the liquid and gaseous states where the effective compressibility of the device is greater than a corresponding spring utilizing only the compressibility of a liquid, and less than a corresponding spring utilizing only the compressibility of a gas.

Still another object of this invention is to provide a fluid spring having small quantities of gas contained therein wherein the gas is entrapped in separate cells formed of resilient material which isolates the gas from the liquid filling the remaining portions of the spring.

Figure 2:
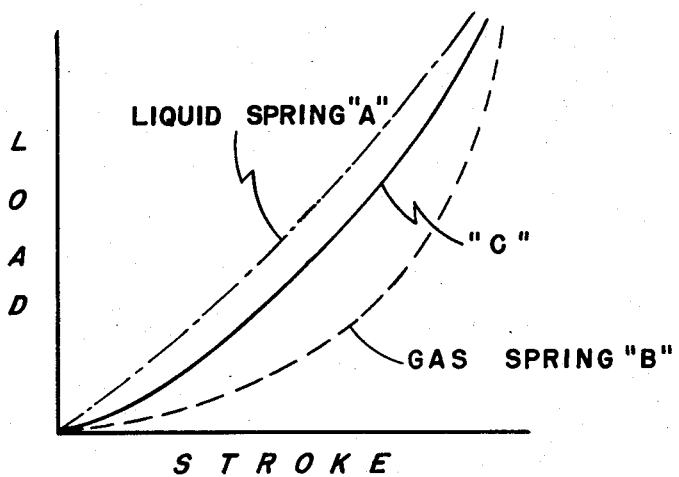

Further objects and advantages will appear from the following description and drawings, wherein:

Figure 1 is a side elevation in longitudinal section showing a fluid spring incorporating a preferred form of this invention; and, Figure 2 is a load stroke diagram showing the comparison of the characteristics of a preferred spring according to this invention with the characteristics of liquid and gas springs.

In the drawings, a fluid spring according to this invention is shown which includes a cylinder 10 formed with an axially extending bore 11 into which a plunger or piston 12 projects. A seal assembly 13 is mounted in the open end of the cylinder 10 against a shoulder 14 by a nut 16 threaded into the cylinder 10. The nut 16 may be formed with opposed bores 17 so that a wrench may be used to adjust it relative to the cylinder. The seal assembly 13 includes a pressure plate 18, a resilient packing 19, and a back up plate 21 wherein the packing is positioned between the pressure and back up plates and is axially squeezed by the force produced by the nut 16 so that it provides a fluid seal against the cylinder 10 and the outer surface of the piston 12. The piston 12 is formed with an axially extending bore 22 extending from its inner end which is open to the fluid cavity defined by the cylinder 10, the piston 12, and the seal assembly 13. The purpose of utilizing a hollow piston is two-fold since removal of the metal from the bore 22 results in a decrease in the weight of the unit and also provides additional volume which can be filled with liquid.

Mounted on the inner end of the piston 12 is a piston head 23 which is secured against a shoulder 24 formed on the piston 12 by a thread fastener 26. The piston head 23 extends from the piston 12 into engagement with the inner wall of the bore 11 and divides the cavity within the spring into a first chamber 27 and a second chamber 28. The chamber 27 includes a zone within the bore 22 formed in the piston 12. A shock absorbing restricted flow connection is provided between the two chambers 27 and 28 through an orifice 29 formed in the piston head 23. Positioned within the chamber 28 is a ring 31 preferably of foam rubber or the like which is formed with a plurality of isolated cells containing gas. The ring 31 should be proportioned so that it is provided with clearances between its inner surface and the piston 12 which clearance can receive a stop skirt 32 formed on the piston head 23. The stop skirt therefore operates to engage the pressure plate 18 when the piston 12 moves to the fully extended position and prevents the ring 31 from being compressed by the piston head 23 at this time. The cylinder 10 should be provided with a threaded charging fitting 33 which can be removed to permit filling of the spring with liquid and the cylinder 10 and piston 12 should be formed with mounting lugs 34 and 36 respectively with which it can be connected to load.

In Figure 1, the structure is shown in an intermediate position between the fully extended and fully compressed positions. When the piston 12 is moved to the fully extended position, it is moved to the right relative to the cylinder 10 until the piston head 23 is adjacent to the ring 31. Conversely, when the piston 12 moves to the fully compressed position, it moves to the left relative to the cylinder until the piston head 23 is adjacent to the left end of the bore 11. During such movement between the extended and compressed positions, the total volume of the chambers 27 and 28 is changed by the volumetric change of the piston 12 within the chambers. Therefore, the total volume of the two chambers is changed as the piston moves by a volume equal to the effective area of the piston 12 times the distance the piston moves relative to the cylinder. As the piston 12 moves to the left toward the compressed position, the liquid within the two chambers 27 and 28 and the gas within the ring 31 will be compressed to a higher pressure and conversely, when the piston 12 moves to the right toward the extended position, the pressure of the liquid and gas is reduced.

By utilizing foam rubber or the like to entrap the gas within the fluid spring, I am able to accurately determine the quantity of gas contained within the spring even though the amount of gas may be very small. In the manufacture of such foam rubber, it is standard to control the average size and density of gas containing cells for any given type of the foam rubber. Therefore, if a larger volume of gas is desired within the spring, it is merely necessary to use a ring 31 having a larger volume and conversely, if less gas is to be used in the spring, a smaller volume ring could be used. The material forming the ring 31 should be of the type wherein individual cells of gas are provided so that the gas will be isolated from the liquid and will not dissolve therein.

The damping or shock absorbing characteristics of the spring are determined by the size of the orifice 29 and by the effective area of the piston head 23. When the piston 12 is moved from the extended position, the volume of the chamber 27 is decreased and the volume of the chamber 28 increases even though the total volume of the two chambers decreases so liquid is caused to flow through the orifice 29 to absorb energy. The flow of liquid through the orifice 29 results in a non-storage absorption of the energy while moving the piston relative to the cylinder to compress the fluid contained within both chambers and results in a storage of energy. Therefore, part of the energy used to move the piston 12 and piston head 23 is stored and part of it is absorbed.

Referring to Figure 2 curve A represents the load stroke curve of a typical liquid spring and the curve B represents the load stroke of an air spring both neglecting damping. The curve C is representative of a load stroke curve of a spring according to this invention which falls within the range between the two curves A and B. If it is desired to produce a curve approaching the curve A, less gas is used and if it is desired to approach the curve B, more gas is used.

Although the preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description is determinative of the scope of the invention.

I claim:

1. A fluid spring comprising a pair of telescoping members capable of relative movement, said members co-operating to define a cavity the volume of which is changed by said relative movement, a resilient material in said cavity secured to one of said members formed with a multiplicity of separate gas filled cells, liquid filling the remaining portions of said cavity, relative movement between said members reducing the volume of said cavity and compressing said liquid and thereby compressing the gas in said cells, and damping means between said members co-operating with said liquid resisting relative movement of said members.

2. A fluid spring comprising a hollow cylinder, a piston projecting into said cylinder, a fluid seal extending between said cylinder and piston co-operating therewith to define a cavity the volume of which is changed by relative movement between said cylinder and piston, a piston head on said piston formed with an orifice dividing said cavity into two chambers connected through said orifice, relative movement between said cylinder and piston in a direction reducing the volume of said cavity decreasing the volume of one of said chambers and increasing the volume of the other of said chambers, liquid in said chambers, and a piece of foam rubber in said second chamber secured to said cylinder formed with a multiplicity of separate cells filled with gas, relative movement between said piston and cylinder in said direction reducing the volume of said cavity producing substantial compression of both said liquid and said gas.

References Cited in the file of this patent

UNITED STATES PATENTS

| 2,333,095 | Dowty | Nov. 2, 1943 |
| 2,333,096 | Dowty | Nov. 2, 1943 |
| 2,701,714 | Harwood | Feb. 8, 1955 |